US012748835B2

(12) United States Patent
Knierim et al.

(10) Patent No.: US 12,748,835 B2
(45) Date of Patent: Sep. 29, 2026

(54) METHOD FOR SECURELY OPERATING A SOFTWARE COMPONENT

(71) Applicant: Siemens Aktiengesellschaft, Munich (DE)

(72) Inventors: Christian Knierim, Munich (DE); Christian Peter Feist, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/847,751

(22) PCT Filed: Mar. 9, 2023

(86) PCT No.: PCT/EP2023/056024
§ 371 (c)(1),
(2) Date: Sep. 17, 2024

(87) PCT Pub. No.: WO2023/180083
PCT Pub. Date: Sep. 28, 2023

(65) Prior Publication Data

US 2025/0111035 A1 Apr. 3, 2025

(30) Foreign Application Priority Data

Mar. 25, 2022 (EP) .................................... 22164407

(51) Int. Cl.
*G06F 21/52* (2013.01)
*G06F 8/65* (2018.01)

(52) U.S. Cl.
CPC ................ *G06F 21/52* (2013.01); *G06F 8/65* (2013.01); *G06F 2221/033* (2013.01)

(58) Field of Classification Search
CPC .................................. G06F 21/52; G06F 8/65
See application file for complete search history.

(56) References Cited

U.S. PATENT DOCUMENTS

2017/0109536 A1 4/2017 Stopel et al.
2018/0115585 A1 4/2018 Rubakha
(Continued)

FOREIGN PATENT DOCUMENTS

CN 109241730 A 1/2019
CN 110909363 A 3/2020
(Continued)

OTHER PUBLICATIONS

Blog (Preventing the TopSecurity WeaknessesFound in StackOverflow CodeSnippets, Dec. 2, 2019, 9 pages) (Year: 2019).*
(Continued)

*Primary Examiner* — Oleg Korsak
(74) *Attorney, Agent, or Firm* — Schmeiser Olsen PLLC

(57) ABSTRACT

A method for updating a software component is provided, having the steps of: retrieving deployment information for the software component, wherein the deployment information includes information on program parts of the software component and the runtime configuration thereof; checking whether at least one program part has a flaw and identifying the program part; determining a runtime limitation for the program part which has been identified as having a flaw; adding runtime limitation information to the deployment information for the software component; and carrying out the deployment of the software component on the basis of the deployment information, wherein upon being ran, the software component is subject to the runtime limitation according to the runtime limitation information. Analyzing and temporarily adapting runtime configuration information of a deployment configuration for correcting flaws in software components to be updated simplifies the handling of zero-day exploit vulnerabilities.

20 Claims, 3 Drawing Sheets

(56) References Cited

U.S. PATENT DOCUMENTS

| | | | | |
|---|---|---|---|---|
| 2018/0349611 | A1 | 12/2018 | Smith | |
| 2019/0005246 | A1 | 1/2019 | Cherny et al. | |
| 2020/0159933 | A1 | 5/2020 | Ciano et al. | |
| 2020/0285733 | A1 * | 9/2020 | Kim | G06F 21/53 |
| 2020/0304526 | A1 | 9/2020 | Abraham et al. | |
| 2021/0103450 | A1 * | 4/2021 | Prasad | G06F 9/45558 |
| 2022/0171856 | A1 * | 6/2022 | Bhatt | G06F 21/52 |
| 2023/0090689 | A1 * | 3/2023 | Knierim | G06F 21/53 |
| 2024/0022591 | A1 * | 1/2024 | Feist | G06F 21/572 |
| 2024/0338459 | A1 * | 10/2024 | Lukas | G06F 21/57 |
| 2024/0386091 | A1 * | 11/2024 | Knierim | G06F 21/53 |
| 2025/0021070 | A1 * | 1/2025 | Feist | G05B 19/0428 |

FOREIGN PATENT DOCUMENTS

| | | | |
|---|---|---|---|
| CN | 112800430 | A | 5/2021 |
| CN | 112868007 | A | 5/2021 |
| CN | 113065125 | A | 7/2021 |

OTHER PUBLICATIONS

Loukidis et al. (Docker-sec: A Fully Automated Container Security Enhancement Mechanism, 2018 IEEE 38th International Conference on Distributed Computing Systems, pp. 1561-1564, 2018) (Year: 2018).*

PCT International Search Report of International Searching Authority mailed Jun. 20, 2023 corresponding to PCT International Application No. PCT/EP2023/056024 filed Mar. 9, 2023.

* cited by examiner

METHOD FOR SECURELY OPERATING A SOFTWARE COMPONENT

CROSS-REFERENCE TO RELATED APPLICATIONS

This application is a national stage of PCT Application No. PCT/EP2023/056024, having a filing date of Mar. 9, 2023, which claims priority to EP Application No. 22164407.3, having a filing date of Mar. 25, 2022, the entire contents both of which are hereby incorporated by reference.

FIELD OF TECHNOLOGY

The following relates to a method for securely operating one or more software components, for example in a computer-controlled industrial automation system. The following is particularly suitable for use in the context of a continuous integration/continuous delivery (CI/CD) pipeline.

BACKGROUND

In many cases, software components are updated via a deployment of software containers. During the update, vulnerabilities can arise in the modified software components, which must be treated as security holes.

Container images or container instances derived from them in a runtime environment can contain such vulnerabilities, as can operating systems or application components. In many cases, vulnerabilities are incorrect or missing checks of parameters passed into function calls. These can be exploited by an attacker, for example by passing specially prepared parameters to socket functions or function calls in the normal program code through exposed interfaces.

Attack techniques based on this, such as remote code execution, SQL injection or the acquisition of privileged permissions, allow cyber security attacks which must be repelled.

If vulnerabilities are detected, they can be published, for example, in publicly accessible databases, e.g., on manufacturers' websites or in aggregated databases. At the same time, the manufacturer of the affected software component usually initiates an error correction process, e.g., by modifying the parameter checking in the program code and providing a newer version for the software component.

This procedure is part of the general software development process. However, the manufacturer of the respective software only maintains the software components that it supports. Older versions are no longer maintained from a date defined by the manufacturer. In addition, in the open source environment it is often the case that the responsibilities are shared, so that on the one hand components such as libraries or programs are maintained by the manufacturer of the programs. On the other hand, the updated components are then packaged and pre-configured by a distributor and undergo a release process. This delays the rapid resolution of critical vulnerabilities.

There is a risk that either the vulnerability-prone software component will never be updated or that no immediate correction will be made. As long as the vulnerability has not been resolved, this situation is referred to as zero-day gaps or zero-day exploits.

There is a desire for a solution that identifies known vulnerabilities in software components on a system or a container instance that have not yet been resolved by patches, and that fixes their exploitability at least temporarily until a fix is provided.

SUMMARY

An aspect relates to a secure operation of software, in particular for software components to be updated.

Accordingly, in embodiments a method for securely operating a software component is proposed, having the following steps:

- retrieving deployment information for the software component, wherein the deployment information includes information about program components of the software component and its run-time configuration;
- checking whether at least one program component has a vulnerability and identifying the program component;
- determining a runtime restriction for the program component identified as having a vulnerability;
- inserting runtime restriction information into the deployment information for the software component; and
- implementing the deployment of the software component on the basis of the deployment information, wherein on being executed, the software component is subject to the runtime restriction in accordance with the runtime restriction information.

The evaluation and, in particular, temporary adaptation of runtime configuration information of a deployment configuration for vulnerability handling in software components to be updated facilitates the handling of zero-day-exploit vulnerabilities. This can be due to a modified runtime configuration for a program component identified as having a vulnerability.

The respective software component is executed or operated in an appropriate processing or production environment.

For example, a vulnerability can involve a possibility of passing unchecked parameters and/or an unwanted function call by the software component. For example, modifying the deployment information when a vulnerability is detected allows for temporary withdrawal of privileges for the software component, reducing the risk of malicious activity.

In embodiments, the runtime restriction comprises in this respect an access rights restriction and/or the limitation of the output of passed-in parameters to other software components or function calls.

In embodiments, the method is carried out automatically as part of a build pipeline, which is part of a CI/CD pipeline, for example. In embodiments, the method is implemented in particular by computer, for example by a vulnerability scanning process. The term vulnerability scanner, or scanner for short, is also used.

In embodiments, a vulnerability scanner is installed in a CI/CD pipeline, wherein the vulnerability scanner analyzes not only the software component images or software images themselves, but also evaluates the deployment information. The deployment information (e.g., Kubernetes yaml files or Docker-Compose files) references the software container images used that contain the binaries and libraries. The deployment information also contains information about their runtime configuration, such as certain runtime restrictions. The latter can be analyzed or searched by the vulnerability scanner, whereby the software component(s) affected by a vulnerability can be identified.

In embodiments, the software component is implemented as an instance of a software container, and an associated software container image comprises package information, binaries, libraries and configuration data as program components.

In embodiments, the deployment comprises the creation of a modified software container image for the software component in accordance with the deployment information supplemented by the runtime restriction.

In embodiments, a functional check of the modified software container image is then carried out in a secure processing environment before deployment. For example, a build pipeline will cause the modified software container image to be generated, and uses a code repository to perform tests on the corresponding software component.

The software component can be deployed in a runtime environment, such as Docker. It is also conceivable that orchestration of software containers takes place, for example by Kubernetes.

In an embodiment, the deployment information references one or more software container images.

In embodiments, the insertion of runtime restriction information is carried out via a merge request for a build pipeline that causes the software component to be updated.

In an embodiment, the vulnerability scanner generates a merge request that is carried out by the build pipeline initiated by the code repository.

In embodiments, the step of checking whether at least one program component has a vulnerability comprises a search of the deployment information and/or a scan of the software container image, for example in the manner of a vulnerability scanner.

In embodiments, the method further comprises:

- extending the deployment information to include vulnerability information which is assigned to the identified software component and/or the program component identified as having the vulnerability, wherein the vulnerability information in particular includes the presence of a vulnerability and/or a correction of the vulnerability by the runtime restriction, and/or
- storing the vulnerability information, which is assigned to the identified software component and/or to the program component identified as having the vulnerability, in a vulnerability database.

The vulnerability database can be retrieved when new software updates occur and the contents thereof can be used to configure the vulnerability scanner.

In embodiments, the method further comprises the steps:

- searching the deployment information for the software component for vulnerability information that is assigned to the software component and/or the identified program component; and
- implementing the deployment of the software component on the basis of the vulnerability information.

In embodiments, checking whether at least one program component has a vulnerability, further comprises:

- storing the vulnerability information as configuration data in a vulnerability database for a vulnerability scanning process.

A method for operating a processing system, which is configured for providing one or more software functions, is also proposed, wherein a plurality of cooperating software components are carried out in runtime environments. In embodiments, the method involves updating one of the software components according to a method as described above or below.

The respective software component can be implemented as an instance in a processing environment, in particular as a software service or cloud service and/or implemented in hardware. In the case of a software-based implementation, the respective software function can be implemented as a computer program product (non-transitory computer readable storage medium having instructions, which when executed by a processor, perform actions), as a function, as a routine, as part of a program code or as an executable object.

A computer program product is also proposed, comprising instructions that, when the program is executed by a computer, cause the computer to carry out the method described above.

A computer program product, such as a computer program means, can be provided or supplied, for example, as a storage medium, such as a memory card, USB stick, CD-ROM, DVD, or else in the form of a downloadable file from a server in a network. This may be effected, for example, in a wireless communication network by the transmission of a corresponding file with the computer program or the computer program means.

The proposed measures for updating software allow not only the software components used to be checked themselves for application and exploitability, but also the interim solutions thereof described in the recorded vulnerability information. Therefore, flexibility and efficiency is gained in vulnerability handling.

The functionality of the changes made to the software component can be ensured using the CI/CD pipeline and the tests defined in the pipeline.

Furthermore, the respective production environment can be tested for the application of the defined vulnerability workarounds by the modified deployment planned. The test result can then be returned to the build pipeline.

Overall, software security is increased.

Further possible implementations of the invention also comprise not explicitly mentioned combinations of features or embodiments described above or below with regard to the exemplary embodiments. A person skilled in the conventional art will in this case also add individual aspects as improvements or additions to the respective basic form of embodiments of the invention.

BRIEF DESCRIPTION

Some of the embodiments will be described in detail, with references to the following Figures, wherein like designations denote like members, wherein.

DETAILED DESCRIPTION

Figure 1:
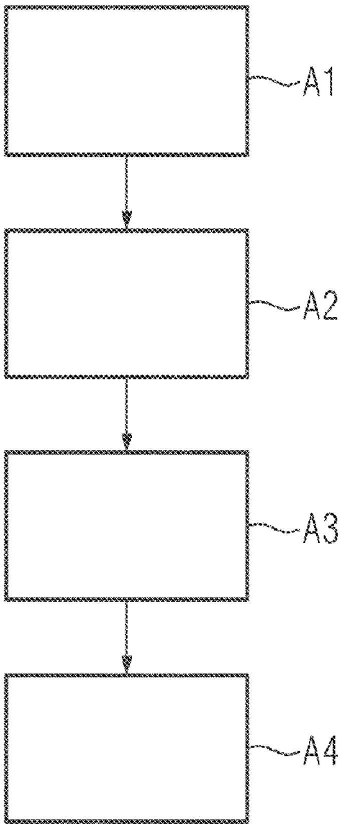
FIG. 1 shows a flowchart with method steps for a first embodiment of a method for updating software components.

FIG. 1 shows a schematic flowchart of a software update. Typically, a deployment of a new software component, i.e., the update of the software, takes place by compiling, testing and merging of the software component or application, taking deployment information into account. Information on vulnerabilities of the software component is not included in the deployment information according to the conventional art.

In order to ensure a secure operation of a software component, for example in a processing environment of an automation network, deployment information for the software component is retrieved in a first step A1. The deployment information contains information about program components of the software component. If the software component is provided in the form of a software container image, the program components include package information, binaries, libraries, and/or configuration data. For example, the configuration data determines the access rights of the software component.

In the next step A2, a check is made to determine whether at least one program component has an exploitable vulnerability, and this program component is identified if appropriate.

The test can be derived from the details given in the deployment information and/or from a scan result of a search of the software container image, for example via a vulnerability scanner. It is also conceivable that the existence of the vulnerability could be read from a vulnerability database.

If no vulnerability has been found, either on the basis of the new software container image and/or a vulnerability database, or no critical vulnerability information can be derived from the deployment information, the software component is tested, the release is implemented in the repository and provided to the production environment. Step A4 (see below) is then performed directly after.

If a vulnerability was found, in step A3 a runtime restriction is specified for the program component identified as having a vulnerability. For example, parameter output or parameter passing of the software component to be updated to other software components is restricted in order to prevent unwanted function calls or interface enables. The runtime restriction is described by runtime restriction information that is added to the deployment information.

Finally, in step A4, the deployment of the software component is carried out, taking into account the deployment information that has been modified or adapted to the identified vulnerability situation. The software component is then subject to the runtime restriction according to the runtime restriction information on execution.

The vulnerability is thus eliminated or its potential risk of exploitation is reduced without the need to wait for a new software component release. In embodiments, the process reduces the risk of damage caused by zero-day-gaps or exploits.

One advantage of the proposed solutions is that compared to common vulnerability scanners which only detect vulnerabilities in container images, the deployment information associated with the image is checked within a CI/CD pipeline. This allows well-defined measures to (temporarily) restrict a vulnerability to be implemented. In addition, the deployment information, which may contain vulnerability information, can be used to identify when protective measures have already been implemented, such as process privileges being revoked. The vulnerability information and/or runtime restriction information appended to deployment information can also indicate whether a detected vulnerability can be exploited at all in the context of the software component.

In embodiments, the method for securely operating software components can allow the processing environment to continue to operate securely, for example after a software component update that reveals a zero-day-exploit vulnerability. Operation is understood in particular to mean the execution of interacting software components in runtime environments.

Figure 2:
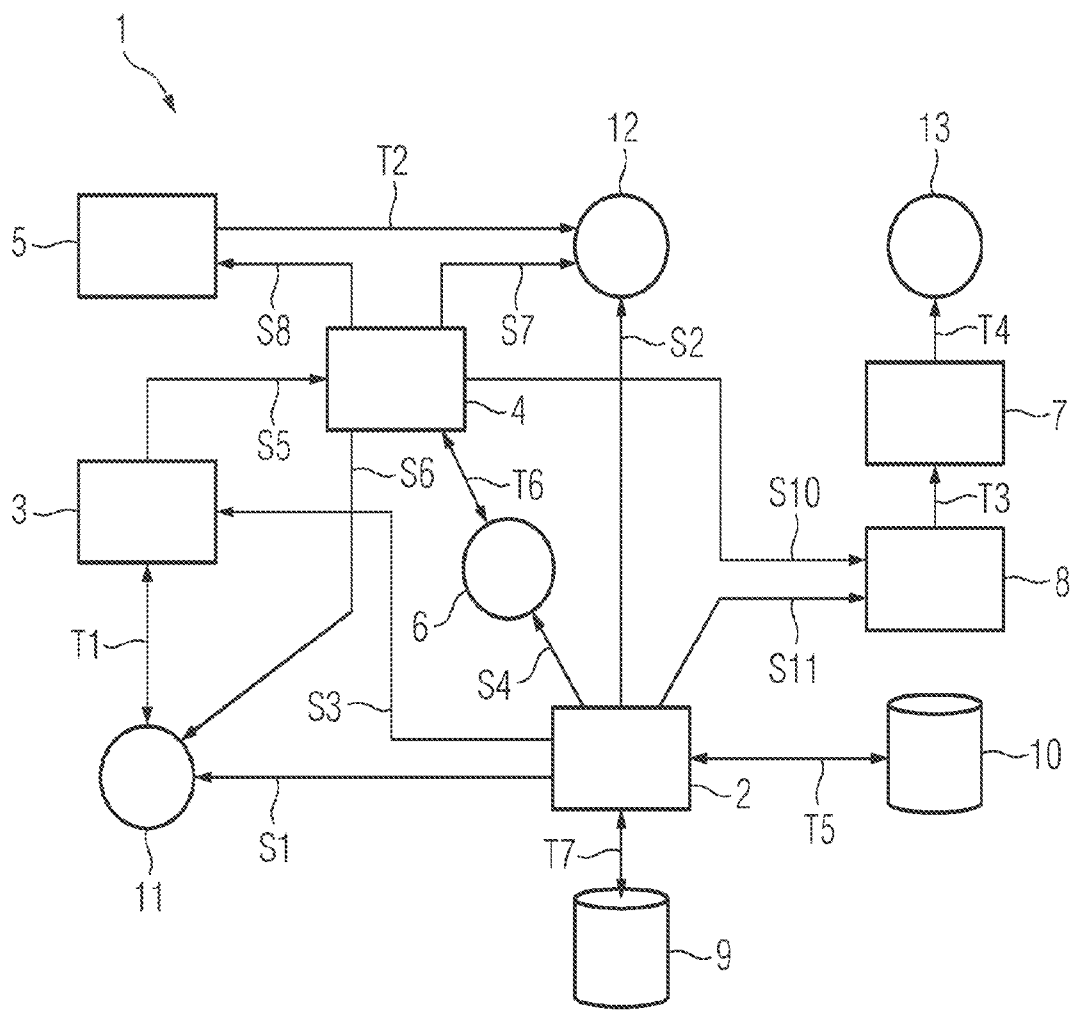
FIG. 2 shows a block diagram for software and hardware components and processes that are used according to a second embodiment of a method for updating software components.
Figure 3:
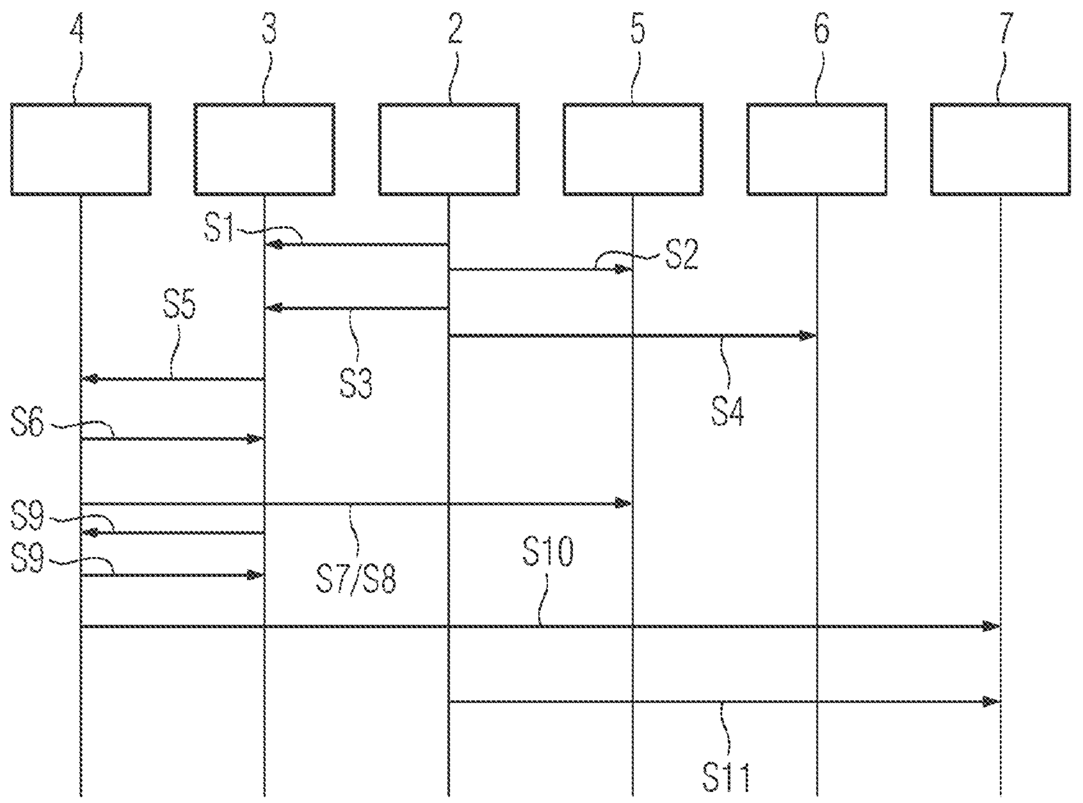
FIG. 3 shows a flowchart with method steps for the second embodiment of the method for updating software components.

In the following, a second exemplary embodiment of a method for updating a software component is explained based on FIGS. 2 and 3. FIG. 1 shows components involved in embodiments of the method and their interaction, and FIG. 3 shows a communication diagram.

The second exemplary embodiment is based on a CI/CD pipeline with a vulnerability scanner 2, a code repository 3, a build pipeline 4, a registry 5, a merge database 6, and a runtime environment 7. FIG. 1 shows further components of the processing system 1, which can be implemented as functionalized hardware or as software services. An orchestrator 8 manages T3 the runtime environment 7 for the instantiation T4 of software containers 13. The vulnerability scanner 2 is communicatively coupled to a vulnerability database 10 and a cache 9. The vulnerability scanner 2 uses T5 the vulnerability information from the vulnerability database 10 and writes and reads T7 its scan results to and from the cache 9.

The code repository 3 manages T1 deployment information 11 and stores it. The container registry 5 provides software container images 12 (step T2). In a merge database 6, the merge requests entered by the vulnerability scanner 2 are identified and stored, which are used and evaluated T6 by the build pipeline 4.

When updating a software container image, i.e., the release of a new version of the underlying software component, the aspects and steps described below can be performed.

It is assumed that the vulnerability scanner 2 is able to access the objects to be searched or analyzed, which in the example considered are software container images or container images, package information contained therein, binaries, libraries and configuration files. This can be carried out directly (step S2) or by retrieval from a vulnerability database 10.

In step S1, the scanning process of the deployment configuration containing the deployment information 11 can be part of the build pipeline 4, or alternatively it can be an outsourced process which is carried out periodically.

In step S2 the software container images 12 referenced in the deployment configuration or information 11 are searched by the scanner 2 in the registries 5, which are referenced in the deployment information 11 for the software component to be updated (step S2). During the scanning process, the components or program components operated within the software container image are identified by accessing the package manager or by matching binary signatures. The components found are matched against a vulnerability database 10, which allows existing known vulnerabilities to be identified.

Since the same software container images, program components or binary components can be referenced multiple times within a deployment by different deployment configurations, previously generated scan results are cached in the cache 9 (step T7). For example, for the scanner 2, a configuration file stores the time at which a new scan of the container image should be carried out or how old the list of vulnerable software components is allowed to be.

In a CI/CD pipeline, images and binaries can be created by translation operations, or components created elsewhere can be referenced. If these are only referenced and used in other pipelines, this information can be stored in a configuration file for the scanner 2. The configuration file for the vulnerability scanning process or the scanner 2 can also be used to store in which other pipeline an image is generated. The scanner 2 then evaluates this information at the respective runtime.

If a vulnerability cannot be remedied by a software update, for example because the image is not built in the stored CI/CD pipeline or because a patch is not yet defined or an updated software component containing the patch is unavailable, the interim solutions defined in the vulnerability database 10 are reported back to the CI/CD pipeline by the scanner 2. This is done by a merge request S3, which is documented S4 in the merge database 6. As an interim solution for the respective vulnerability, a runtime restriction is provided, for example, a restriction of privileges of the software component. Runtime restrictions are in particular the revocation of process privileges of the runtime user by the assignment of specific Seccomp profiles or Linux capabilities defined to minimize the attack surface, as well as the assignment of special mount options for the file systems mounted on the instance. This is achieved by changing the deployment information, which is updated in step S6. The build pipeline 4, which was started by the code repository in step S5, adapts the deployment information or deployment configuration accordingly.

The build pipeline 4 then generates, in step S7, the container image 12 of the software component to be updated, which is stored S8 by the registry 5. After the testing S9 of the software component, a deployment can be performed S10.

In addition, the exploitation of a vulnerability can be prevented by defining a modified Mandatory Access Control profile. Another option is to define appropriate configuration settings for the software component introduced with the deployment, in such a way that parameter checks for passed parameters are ensured and appropriately structured calls are detected and blocked using regular expressions. The runtime restriction is achieved by opening a merge request within the pipeline 4 with the proposed runtime modifications. Runtime modifications or runtime restrictions can be, for example, the withdrawal of certain rights, which are automatically proposed as a modification in the deployment configuration 11. The proposed changes can be reviewed by the developer or, when automatic merges are used, they can be reviewed using (semi-)automatic unit and integration tests.

The automatically generated merge request, which requires the runtime restrictions to be implemented to prevent the exploitation of the vulnerability in the separate CI/CD pipeline, extends the deployment information 11 to include the defined runtime restrictions. The merge request can be implemented either automatically, semi-automatically (given successful completion of the tests) or manually by the operators of the CI/CD pipeline. It is also conceivable that, depending on the criticality of the detected vulnerability, this can be implemented either manually, with the semi-automatic method described, or automatically. The behavior of the system is defined by the person responsible for the CI/CD pipeline, in a configuration file, for example.

The deployment parameters and configuration options introduced via the scanner 2 are marked accordingly for traceability during a merge and referenced with the aforementioned vulnerability. The reference can be performed by appropriate comments in the merge history.

A further merge request is not created by the scanner 2 until step S3, when the vulnerability has been corrected by applying a corresponding patch and can no longer be detected. For this purpose, a reference is made for the scanner 2 in an outsourced database 6 as to which merge requests were carried out due to a detected vulnerability for a deployment. The ID of the merge request is linked to the vulnerabilities referenced hereby and the deployment configuration. Within the pipeline 4, in every subsequent scan it is checked whether the referenced vulnerability is still detected and therefore the conditions for the runtime restrictions are still met. If this is no longer the case, the restrictions can be undone by creating an undo-merge request.

If the build process 4 of the image 12 takes place within the separate CI/CD pipeline, it is conceivable that the image 12 will be translated with modified compile operations (e.g., using Intel GET/Clang CFI, e.g., to mitigate ROP attacks).

Furthermore, it is possible that a temporary mitigation has new requirements on the underlying runtime platform 7, 8 or that special hardware requirements are necessary. In an orchestrating cluster, it is conceivable that, as part of the creation of a modified deployment configuration, special labels are assigned to the generated images or deployment information, so that in an orchestrated container environment the orchestrator 8 can automatically select the correct target platform 7 or verify whether the newly introduced deployment is actually operational on the platform at all.

If the temporary adjustments of the privileges and configuration settings are applied by the runtime restriction information contained in the deployment information, the required functional tests (step S9) are performed within the build pipeline 4. If these fail, the development team is informed. It is possible that the developer will manually define that specific identified vulnerabilities (e.g., by referencing with CVE numbers or by time limitation) should not be corrected by privilege adjustment in order to maintain the operational state of the application managed in the CI/CD pipeline.

In order to prevent the exploitation of vulnerabilities from taking place in the production environment, the deployed configurations used in the production environment can be synchronized by the scanner 2 (step S11). The deployment configurations can be queried by the scanner 2 either from the orchestrator 8 or determined by direct access to the runtime environment 7. If deviations from the deployment are detected in the CI/CD pipeline, deviations can also be reported to the CI/CD pipeline, e.g., via appropriate warnings or incidents or issues. Even then, the scan process can be performed either as part of the build process 4 within the pipeline or as a periodic scan.

As soon as an image or the software component used in the pipeline no longer has a vulnerability, the configuration changes introduced by the scanner 2 can be automatically or manually undone depending on the configuration selected in the CI/CD pipeline, because the changes introduced by the scanner were referenced with the corresponding vulnerabilities.

Using deployment configuration data automatically neutralizes a vulnerability until a patch is available for the affected software component.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for securely operating a software component, the method comprising:

retrieving deployment information for the software component, wherein the deployment information includes information about program components of the software component and a runtime configuration thereof;

checking whether at least one program component has a vulnerability and identifying the at least one program component;

determining, in response to the checking, a runtime restriction specific to the vulnerability of for the at least one program component identified as having the vulnerability;

inserting runtime restriction information into the deployment information for the software component without replacing the at least one program component identified as having the vulnerability; and implementing a deployment of the software component on a basis of the deployment information, wherein on being executed, the software component is subject to the runtime restriction in accordance with the runtime restriction information.

2. The method as claimed in claim 1, wherein the software component is implemented as an instance of a software container and an associated software container image comprises package information, binaries, libraries and configuration data as program components.

3. The method as claimed in claim 2, wherein the deployment comprises a creation of a modified software container image for the software component in accordance with the deployment information supplemented by the runtime restriction.

4. The method as claimed in claim 3, wherein before deployment, a functional test of the modified software container image is carried out in a secure processing environment.

5. The method as claimed in claim 1, wherein the software component is deployed in a runtime environment.

6. The method as claimed in claim 1, wherein the deployment information references one or more software container image(s).

7. The method as claimed in claim 1, wherein the inserting the runtime restriction information is carried out via a merge request for a build pipeline that causes the software component to be updated.

8. The method as claimed in claim 1, wherein the checking comprises a search of the deployment information and/or a scan of the software container image.

9. The method as claimed in claim 1, wherein the runtime restriction comprises an access rights restriction and/or a limitation of an output of passed-in parameters to other software components or function calls.

10. The method as claimed in claim 1, further comprising:

extending the deployment information to include vulnerability information which is assigned to the identified software component and/or the at least one program component identified as having the vulnerability, wherein the vulnerability information includes a presence of a vulnerability and/or a correction of the vulnerability by the runtime restriction, and/or storing the vulnerability information, which is assigned to the identified software component and/or to the at least one program component identified as having the vulnerability, in a vulnerability database.

11. The method as claimed in claim 1, further comprising:

searching the deployment information for the software component for vulnerability information that is assigned to the software component and/or the identified program component; and implementing the deployment of the software component on a basis of the vulnerability information.

12. The method as claimed in claim 10, wherein the checking further comprises:

storing the vulnerability information as configuration data in a vulnerability database for a vulnerability scanning process.

13. The method as claimed in claim 1, wherein a vulnerability involves a possibility of passing unchecked parameters and/or a function call by the software component.

14. A method for operating a processing system which is configured for providing one or more software functions, wherein a plurality of cooperating software components are implemented in runtime environments, comprising:

operating one of the software components according to a method as claimed in claim 1.

15. A computer program product, comprising a computer readable hardware storage device having computer readable program code stored therein, said program code executable by a processor of a computer system to implement a method, as claimed in claim 1.

16. The method as claimed in claim 1, wherein the inserting runtime restriction information into the deployment information is performed in response to detecting the vulnerability during a vulnerability scanning process.

17. The method as claimed in claim 1, wherein the runtime restriction comprises at least one of: revocation of process privileges of a runtime user by assignment of specific security profiles, assignment of special mount options for file systems, or parameter validation using regular expressions to detect and block inappropriately structured calls.

18. The method as claimed in claim 1, wherein the runtime restriction is implemented as an interim solution until a software update containing a patch for the vulnerability becomes available, and, in response to determining that the vulnerability is no longer detected, undoing the runtime restrictions.

19. The method as claimed in claim 1, wherein the runtime restriction is determined based on interim solutions defined in a vulnerability database for the identified vulnerability.

20. The method as claimed in claim 1, wherein the runtime restriction information is marked for traceability and referenced with the identified vulnerability.

* * * * *